United States Patent Office 3,347,894
Patented Oct. 17, 1967

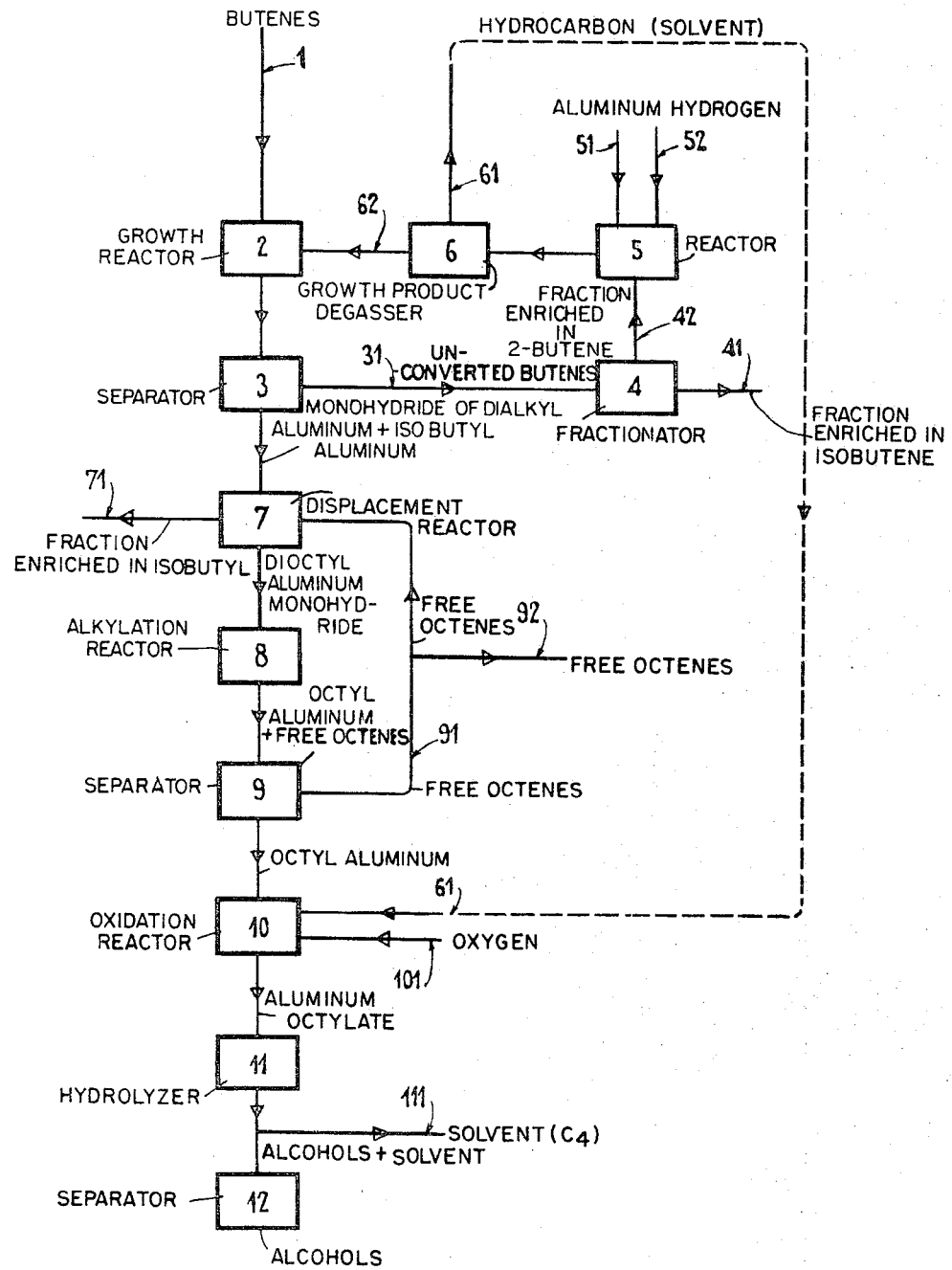

3,347,894
PREPARATION OF ALUMINUM TRIOCTYL FROM BUTENE VIA GROWTH, DISPLACEMENT AND ALKYLATION REACTIONS WITH RECYCLE OF OLEFINS
Emile Trebillon, Paris, and Georges Wetroff, Le Thillay, France, assignors to Pechiney—Compagnie de Produits Chimiques et Electrometallurgiques, Paris, France
Filed Sept. 19, 1962, Ser. No. 224,647
Claims priority, application France, Sept. 20, 1961, 873,659
11 Claims. (Cl. 260—448)

This invention relates to the preparation of aliphatic primary alcohols and more particularly to the preparation of aliphatic primary alcohols of 8 carbon length from butenes as a raw material.

Alcohols have been prepared from hydrocarbons comprising normal butenes which are substantially free of isobutenes by the pathway of forming intermediate octenes by catalytic reaction with butyl-aluminum. Thereafter the octenes are reacted with hydrogen and aluminum to form octyl-aluminum which is subjected to oxidation and then hydrolysis to form the octyl alcohol.

In the foregoing process, it is desirable to make use of a purified butene from which the reactive impurities such as moisture, oxygen, butadiene, acetylenic derivatives, sulphurated derivatives, carbon dioxide, COS, and the like are removed and which have also been separated from the lower hydrocarbons such as propylene and heavier hydrocarbons, as by distillation.

The dimerization of the butenes is carried out in accordance with the following equations, in the presence of alkyl-aluminum as a catalyst:

(1) $\text{al}-C_4H_9 + C_4H_8 \rightarrow \text{al}-C_8H_{17}$
(2) $\text{al}-C_8H_{17} + C_4H_8 \rightarrow \text{al}-C_4H_9 + C_8H_{16}$ In the foregoing equations, the term "al" is used to designate ⅓ of an gram-atom of aluminum in the combined state.

The unconverted butenes are removed, the dimer is distilled and the catalyst is recycled. The dimer is employed as a raw material in the reaction with aluminum and hydrogen in the preparation of octyl-aluminum. The octyl-aluminum is oxidized, generally in the presence of a diluent, to produce aluminum octylate, which is then hydrolyzed to form octyl alcohol and alumina.

There are a number of disadvantages in the practice of the process described for the preparation of alcohol from butenes.

The albyl-aluminum type catalyst is very sensitive to the reactive impurities of the type previously mentioned, in that the activity of the catalyst is rapidly destroyed even when such impurities are present in very small amounts. The described noxiousness is aggravated by the necessity continuously to recycle the catalyst such that the slightest traces of such impurities exert a cumulative action to cause destruction of the catalytic effect after relatively few cycles. Thus, it becomes essential, in the practice of the aforementioned process, to provide for substantially complete elimination of active impurities from the raw material and to maintain practically sealed conditions during the operation of the process. For example, in order to avoid excessive consumption of catalyst, it is desirable to eliminate moisture by reduction to an amount no greater than about 10 parts per million in the feed and to reduce butadiene to an amount no greater than about 200 parts per million. Such severe requirements for reduction and preferably elimination of active impurities raise considerable technical problems and can be achieved only at great expense.

Further, the recycling of the catalyst operates to subject the alkyl-aluminum to prolonged heating. This gives rise to partial cracking of the alkyl-aluminum with corresponding loss of activity and with the generation of various impurities which remain in the system.

It has also been found that when the amount of isobutene rises to a level of about 5% by weight in the raw materials presented for dimerization, the consumption of catalyst becomes so prohibitive as to render the process impractical. To avoid this draw-back, it has been found desirable to eliminate isobutene from the butenes fed to the dimerization reaction, but such elimination is costly and complicated.

Still further, it is known that reaction of aluminum, hydrogen, and an olefin to form an alkyl derivative of aluminum is accompanied by hydrogenation of the olefin to cause losses thereof.

The octyl-aluminum which is obtained by dimerization in accordance with the foregoing reaction is subject to dissociation in accordance with the reaction (2), thus requiring additional synthesis of the octene in accordance with the following reaction (3) whereby it becomes a relatively expensive dimer which is subjected to loss by hydrogenation:

(3) $\quad Al + \tfrac{3}{2}H_2 + 3C_8H_{16} \rightarrow Al(C_8H_{17})_3$

On the other hand, the 2-butene, which is less reactive than the 1-butene, escapes in great measure the dimerization reaction and accumulates as a part of the by-products which are considered as being inactive and of little value.

Finally, the oxidation reaction to which the octyl-aluminum is subjected is recognized as a dangerous reaction. Explosive conditions are easily obtained, such for example as by autoinflammation of the air and organic compound mixtures upon overheating.

It is an object of this invention to provide a method and means for the preparation of aliphatic primary alcohols which are free of many of the objectionable features of the process of the type described and it is a related object to provide a process for the preparation of primary alcohols containing 8 carbon atoms from hydrocarbons constituted primarily of butenes.

Another object is to provide a method of preparation of 8 carbon atom primary alcohols from butenes by reaction of the butenes to form an aluminum alkyl derivative as an intermediate and reaction of the intermediate by oxidation and then by hydrolysis to form the desirable end product.

These and other objects and advantages of this invention will hereinafter appear and for purposes of illustration, but not of limitation, reference will be made to the accompanying flow sheet in the description of the invention.

Briefly described, the new and improved process of this invention is carried out in the following stages in combination:

(a) The hydrocarbons, formed principally of butenes which in this process may contain 5% by weight or more isobutene and/or about 10% by weight or more of normal butenes, are subjected to a reaction, hereinafter referred to as a growth reaction, while in contact with an aluminum alkyl derivative formed principally of butyl-aluminum, at a temperature within the range of about 130–280° C. and preferably at a temperature within the range of about 180–200° C., while under a pressure of between about 200–400 kg./cm.² and preferably between about 55–110 kg./cm.² with the ratio "A" between the number of aluminum gram valences fixed in the alkyl-aluminum used in the growth reaction and the number of gram molecules in the total 1-butene present, either fixed in the aluminum, or in a free state, being selected to be between 0.18 to 2.1 and preferably between 0.4 to 0.9. The growth reaction corresponds to Equation 1.

(b) The butenes which have not been converted during the growth reaction are separated at a temperature between about 50–200° C. and preferably 100–180° C. and at a pressure between about 0.2 to 10 kg./cm.² and preferably 1 to 5 kg./cm.². A part of such separated unconverted butenes, preferably enriched in 2-butene, is reacted with aluminum and hydrogen to produce the alkyl-aluminum used as the catalyst in the growth reaction.

(c) The product of the growth reaction, after separation of the unconverted butenes, is subjected to the action of olefins composed mostly of α-octenes from a later stage of the process, and then the following are carried out in successive steps:

(1) A displacement reaction is carried out at a temperature between about 90–200° C. and preferably between 125–160° C. to displace isobutyl groups still present in the form of isobutyl aluminum after the growth reaction, said displacement reaction corresponding to the following Equation 4:

(4) 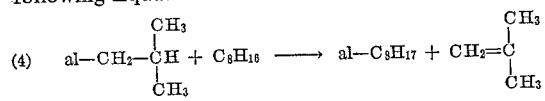

(2) The materials are subjected to an alkylation reaction of the monohydrides of dialkyl-aluminum formed during the growth reaction; the alkylation reaction, which is carried out at a temperature of about 75–140° C. and preferably between 100–110° C. and at a pressure between about 0.5 to 10 kg./cm.² and preferably at about atmospheric pressure, is in accordance with the following Equation 5:

(5) $\quad H-Al(C_8H_{17})_2 + C_8H_{16} \rightleftarrows Al(C_8H_{17})_3$ (3) The olefins are separated at a temperature below 100° C. and preferably between about 40–75° C.

(4) The separated olefins are recycled to the displacement and the alkylation reaction; the ratio "B" on a weight basis of the recycled olefins to the product of the growth reaction, after the unconverted butenes have been removed, being between 0.02 to 1 and preferably between about 0.07 to 0.40.

Referring now to the flow sheet for a further description with respect to the flow of materials, 1 represents a fraction of a purified butene used as the raw material; 2 the growth reactor; 3 the separator for removal of unconverted butenes and 31 the unconverted butenes issuing from the separator 3; 4 the fractionation equipment, 41 the fraction enriched in isobutene and 42 the fraction enriched in 2-butene, both of which issue from the fractionation unit 4; 5 the reactor for the synthesis of butyl-aluminum, 51 the feed of aluminum and 52 the feed of hydrogen introduced for synthesis into the reactor 5; 6 the degassing equipment and 61 the solvent in C4 issued from the degassing unit 6 and fed to the oxidation reactor 10 and 62 the butyl-aluminum introduced into the reactor 2; 7 the equipment for the displacement reaction of isobutyl groups and 71 the fraction issued from the equipment which is enriched with isobutyl; 8 the reactor for alkylation of the dioctyl-aluminum mono-hydride; 9 the equipment for separating the free octenes, 91 the recycling of the free octenes and 92 the draw-off of a small proportion of the recycled octenes; 10 the oxidation reactor and 101 the oxygen introduced into the reactor 10; 11 the equipment for hydrolysis of the aluminum alcoholates and 111 the solvent C4 recovered during the hydrolysis; and 12 the equipment for separating the alcohols.

The phenomenon which enables the use of a hydrocarbon feed containing up to 5% by weight of mono-isobutene and/or up to 10% by weight or more of normal butene, which were not permitted in the dimerization reactions of the prior processes, may be explained as follows:

The isobutene can fix itself to the butyl-aluminum according to the reaction (6):

(6) 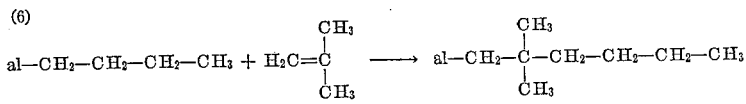

The (dimethyl-2,2-hexyl) aluminum that is formed no longer has an aptitude for reaction in accordance with Equation 2. This results in a progressive loss of catalyst activity due to the accumulation of such molecules during successive recycling resulting in the catalyst becoming rapidly unuseful.

It has been found, in accordance with the concepts of this invention, that the means for avoiding this progressive destruction of the catalyst consists in suppressing its successive recycling and in reducing the dissociation of the octyl-aluminum, expressed by the above reaction (2), to a minimum and to make use of a proportion A between the butenes and bonded aluminum in the form of alkyl-aluminum. Such means for avoiding the aforementioned destruction of the catalyst due to the presence of isobutene constitute an unexpected but important advance which was not predictable from the state of the art.

The following is an example of the practice of this invention:

As the raw material, use is made of a cut of purified butenes or petroleum hydrocarbons from which the butadiene has been extracted and which has the following analysis:

TABLE 1

| Material | g./h. | mol./h. |
|---|---|---|
| 1-butene | 1,660 | 29.7 |
| 2-butene | 1,360 | 24.2 |
| i-Butene | 2,630 | 47.0 |
| Propylene | 10 | 0.3 |
| Saturated butanes | 340 | 6.1 |
| Total | 6,000 | 107.3 |

In this and in the following tables, the letter g. refers to grams and the letter h. refers to a time unit in hours.

The feed of the raw material is introduced into the growth reactor 2 containing the butyl-aluminum. The small fraction of propylene in the feed can react with butenes to form dimers of 7 carbon length.

The butyl-aluminum introduced into the reactor 2 has the following analysis:

TABLE 2

| Material | g./h. | mol./h. |
|---|---|---|
| AlH₃ | 240 | 8 |
| n-Butene | 400 | 7.15 |
| i-Butene | 700 | 12.5 |
| Misc. | 160 | 4.35 |
| Misc. | 160 | 4.35 |
| Total of the olefine bound to Al | 1,500 | 24 |

In the foregoing table, the compound AlH₃ represents the quantities of aluminum and hydrogen corresponding to the symbols. It is not meant to represent the use of aluminum trihydride or free olefins. The table is intended to indicate the proportion of free olefin bound to the aluminum hydride as trialkyl aluminum or dialyl aluminum hydride and thus defines the composition of the alkyl-aluminum that is used.

In the growth reactor 2, the reaction is carried out at a temperature of about 190° C. and a pressure of about 100 kg./cm.². The ratio A, as previously defined, is equal to:

$$\frac{8 \times 3}{29.7 + 7.15} \text{ or } 0.65$$

The unconverted butenes, separated from the effluent from the reactor 2 in the separator 3 at a temperature of about 150° C. and under a pressure of about 3 kg./cm.², has the following analysis:

TABLE 3

| Material | g./h. | mol./h. |
|---|---|---|
| 1-butene | 110 | 1.97 |
| 2-butene | 1,410 | 25.2 |
| i-Butene | 2,360 | 42 |
| Saturated | 340 | 5.86 |
| Total | 4,220 | 75.03 |

The fraction of unconverted butenes from the separator 3 is advanced through line 31 to the fractionator 4 where it is divided into a head portion enriched in isobutene and having the following analysis:

TABLE 4

| Material | g./h. | mol./h. |
|---|---|---|
| 1-butene | 48 | 0.86 |
| 2-butene | 90 | 1.61 |
| i-Butene | 1,206 | 21.6 |
| Saturated | 120 | 2.15 |
| Total | 1,464 | 26.22 | and a tail portion enriched in 2-butene and having the following analysis:

TABLE 5

| Material | g./h. | mol./h. |
|---|---|---|
| 1-butene | 42 | 0.75 |
| 2-butene | 1,310 | 23.4 |
| i-Butene | 1,150 | 20.6 |
| Saturated | 220 | 4.0 |
| Total | 2,722 | 48.75 |

The head portion is passed through line 41 while the tail portion enriched in 2-butene is advanced in line 42 to the reactor 5 for synthesis of butyl-aluminum. For this synthesis, aluminum is introduced through line 52 into the reactor 5 in an amount corresponding to 216 g./h. or 8 mol./h. and hydrogen is introduced through line 51 into the reactor 5 in an amount corresponding to 84 g./h. or 42 mol./h. The reaction between the butene, hydrogen and aluminum to produce butyl-aluminum is well known to the art.

The product from the reactor 5 is advanced to the unit 6 for separation of hydrocarbons that have not reacted, such separation product having the following analysis:

TABLE 6

| Material | g./h. | mol./h. |
|---|---|---|
| 1-butene | 6 | 0.1 |
| 2-butene | 227 | 4.1 |
| i-Butene | 22 | 0.4 |
| Saturated | 1,195 | 21.2 |
| Total | 1,450 | 25.8 |

The unreacted hydrocarbons, separated at 6, are advanced through line 61 to the oxidation reactor 10 for use as a solvent. The head fraction, richer in isobutene, can be used in such processes as in the manufacture of polyisobutene or hydroxybutyric acid.

Returning now to the separator 3, the product of the growth reaction, with the unconverted butene removed, is advanced to unit 7 to displace the isobutyl groups by reaction at 150° C. and under atmospheric pressure. Displacement is effected with olefins essentially of 8 carbon length, introduced at a flow rate of 1,000 g./h. or 8.9 mol./h.

From Tables 1, 2 and 3, it can be calculated that the ratio B is equal to about 0.30.

The hydrocarbon rich in isobutene, resulting from the displacement reaction, and removed through line 71, has the following approximate analysis:

TABLE 7

| Material | g./h. | mol./h. |
|---|---|---|
| n-Butene | 53 | 0.94 |
| Isobutene | 405 | 7.25 |
| Saturated | 12 | 0.21 |
| Total | 470 | 8.4 |

The separated hydrocarbons rich in isobutene can be used in the production of such materials as polyisobutene or hydroxybutyric acid.

From the reactor 7, the reaction product, from which the fraction rich in isobutene has been removed, is advanced to the alkylation unit 8 operating under ambient pressure and at a temperature of about 100–110° C. From the alkylation unit 8, the material is advanced to a separation equipment 9 for separation of the free olefins, essentially of 8 carbon atoms in length, as by distillation, under 3 mm. of mercury and at a temperature of about 70° C. The free olefins removed are recycled through line 91 to the displacement reactor 7; a small proportion, such as 40 g./h. (0.36 mol./h. expressed in octene) may be bled through line 92 for removal from the system.

The octyl-aluminum from the separator 9 is advanced to the oxidation reactor 10 along with the introduction of oxygen at a rate or 384 g./h. (12 mol./h. and the solvent hydrocarbon mixture from the separator 6, as defined in Table 6. Oxidation is carried out a temperature of about 50° C. and under a pressure of about 6 kg./cm.² with the oxygen pressure being within the range of about 1 kg./cm.². The danger of explosion or fire is avoided by reason of the low ratio of the partial pressure of oxygen to the solvent component.

From the oxidation reactor 10, the product is advanced to the hydrolysis unit 11 where hydrolysis is carried out in accordance with well known procedures. After hydrolysis, the oxidation solvent is collected as a by-product and removed through line 111.

After drying and fractionation in the separator 12, a product is secured having the following analysis:

TABLE 8

| Material | g./h. | mol/h. |
|---|---|---|
| Alcohols C₄ and <C₄ | 755 | 10.38 (in C₄) |
| Saturated hydrocarbons in C₈ | 135 | 1.35 (in C₈) |
| Alcohols in C₈ | 1,600 | 12.3 (in C₈) |
| Alcohols >C₈ | 120 | 0.76 (in C₁₀) |
| Total | 2,610 | 24.79 |

In the above table, the fraction identified as alcohol C₈ is analyzed to have the following composition:

TABLE 9

| Material: | Percent in weight |
|---|---|
| 2-ethyl-hexanol | 80 |
| 2-2-dimethyl-hexanol | 10 |
| 2-ethyl-4-methyl-pentanol | 6 |
| 1-octanol | 2 |
| 2-methyl-hexanol | 2 |
| Total | 100 |

The formed alcohol finds excellent use as a plasticizer, such as a plasticizer for ortho-phthalic ester and for many other uses.

Numerous advantages and improvements are achieved by the process of this invention:

(1) The described process differs from processes heretofore employed in that the process of this invention permits the use of raw materials containing isobutane in an amount greater than 5% by weight for conversion to octyl alcohols, without requiring purification for removal of isobutene or for reduction thereof to an amount less than 5% by weight;

(2) The described process makes beneficial and valuable use of the unreacted 2-butene and isobutene in the production of the octyl alcohols which are similar to the octyl alcohols formed by previous processes.

(3) In previous processes, the 2-butene separated from the dimerization reaction was considered inert and of very little value. On the other hand, in accordance with the practice of this invention, such butenes are divided into one fraction rich in isobutene and suitable for use in the production of polyisobutene, hydroxybutyric acid and the like, while another fraction rich in 2-butene is reacted with aluminum and hydrogen to produce n-butyl-aluminum. The butenes separated from the displacement reaction, which are rich in isobutene, find valuable use as a raw material in the preparation of polyisobutene, hydroxybutyric acid and the like.

(4) In prior processes of the type heretofore described, the cost for the product is increased by reason of excessive losses of olefin because of hydrogenation during synthesis of the alkyl dimer from aluminum, hydrogen and olefin whereas, in the process of this invention, hydrogenation is carried out on olefins which have heretofore been considered valueless and thereby eliminating this loss factor.

(5) The process described does not require recycling the alkyl-aluminum catalyst. As a result, it becomes unnecessary to effect the complete and costly removal of active impurities from the hydrocarbon raw materials. For example, no difficulties are encountered in the processing of a hydrocarbon system containing 0.5% by weight butadiene.

(6) Further, in the permitted absence of the recycling of the alkyl-aluminum catalyst, the latter is not exposed to prolonged heating at elevated temperature thereby to eliminate the difficulties heretofore encountered by the cracked by-products.

(7) In accordance with a modification of this invention, the oxidation reaction can be achieved in the presence of solvent components formed of a mixture of butanes and butenes, under pressure conditions corresponding to the ebullition of the solvent component at a temperature between 0–120° C. and preferably between 30–60° C., such pressure conditions corresponding to between about 1–25 kg./cm.$^2$ and preferably 4–7 kg./cm.$^2$.

(8) In the oxidation reactor 10, the ratio of solvent to oxidation, as measured by their partial pressures, is maintained at a value of 3 or more. This places the mixture sufficiently above the range for an explosive mixture in the presence of alkyl-aluminum thereby to practically eliminate all dangers of fire or explosion.

(9) The process steps of this invention are capable of being joined into a continuous low cost and safe operation with the continuous flow of materials as indicated in the foregoing example.

It will be understood that numerous changes may be made in the details of construction, composition and reactive conditions without departing from the spirit of the invention, especially as defined in the following claims.

We claim:

1. The process for preparing essentially aluminum trioctyl in which a hydrocarbon formed principally of butenes, including 1-butene, is a reactant consisting of:
   (1) the steps of bringing the hydrocarbon into reactive relationship with an aluminum alkyl derivative consisting principally of aluminum butyls in a growth reaction at a temperature within the range of 130–280° C. and at a pressure within the range of 20–400 kg./cm.$^2$, the ratio between the number of gram valances fixed in the aluminum alkyl derivative and the number of gram molecules of total 1-butene fixed in the aluminum and in a free state being within the range of 0.18 and 2.1;
   (2) distilling out unconverted butenes from the product of the growth reaction at a temperature between about 50–200° C. and at a pressure between about 0.2–10 kg./cm.$^2$;
   (3) reacting the product of the growth reaction after unconverted butenes have been distilled out with olefins consisting of alpha-octenes in a displacement reaction at a temperature within the range of 90–220° C. and in the weight ratio of olefins to the resulting product of the growth reaction in a range of 0.02 to 1;
   (4) alkylating the product of the displacement reaction with alpha-octenes at a temperature within the range of 75–140° C. to produce aluminum trioctyls;
   (5) maintaining the pressure during the displacement reaction and the alkylation reaction within the range of 0.5 to 10 kg./cm.$^2$; and
   (6) distilling octenes from the product of the alkylation reaction at a temperature below 100° C. to leave a product containing aluminum trioctyls.

2. The process as claimed in claim 1 in which the growth reaction is carried out at a temperature between about 180° C. and about 200° C. and at a pressure within the range of 55–110 kg./cm.$^2$.

3. The process as claimed in claim 1 in which the ratio between the number of aluminum gram valences fixed in the alkyl aluminum used during the growth reaction and the number of gram molecules of total 1-butene present fixed in the aluminum as well as in the free state is between about 0.4 and about 0.9.

4. The process as claimed in claim 1 which includes the additional steps of separating the unconverted butenes removed from the product of the growth reaction into one fraction enriched in isobutene and another fraction enriched in 2-butene, and reacting the fraction enriched in 2-butene with aluminum and hydrogen to produce aluminum butyls.

5. The process as claimed in claim 1 in which the octenes are separated out from the product of the alkylation reaction at a temperature within the range of about 40–75° C.

6. The process as claimed in claim 1 in which the growth reaction is carried out at a temperature within the range of 180–220° C. and at a pressure between about 55 kg./cm.$^2$ and about 110 kg./cm.$^2$, in which the separation of the butenes unconverted from the growth reaction is carried out at a temperature between about 50° C. and about 200° C. and at a pressure between 0.2 kg./cm.$^2$ and about 10 kg./cm.$^2$, in which the displacement reaction is carried out at a temperature between about 125° C. and about 160° C. and at ambient pressure, and in which the alkylation reaction is carried out at a temperature between about 100° C. and 110° C. at ambient pressure.

7. The process as claimed in claim 1 in which hydrocarbons consisting of a major portion of butenes and containing at least 5% by weight isobutene and at least 10% by weight normal butenes are chosen as the raw material.

8. The process as claimed in claim 4 which includes the step of feeding the aluminum butyls that are formed as feed of aluminum alkyls derivative in the growth reaction.

9. The process as claimed in claim 8 which includes the step of stripping the product produced in accordance with claim 4 of unreacted butenes and butanes.

10. The process as claimed in claim 1 which includes the additional step of recycling octenes separated from the product of the alkylation reaction as feed for the displacement reaction.

11. The process as claimed in claim 10 which includes the additional step of removing octenes from the recycle which are in excess of the amount required for the displacement reaction.

References Cited

UNITED STATES PATENTS

| | | | |
|---|---|---|---|
| 2,835,689 | 5/1958 | Ziegler et al. | 260—632 |
| 2,863,895 | 12/1958 | Kirshenbaum et al. | 260—632 |
| 2,863,896 | 12/1958 | Johnson | 260—448 |
| 2,987,535 | 6/1961 | Merviss et al. | 260—448 |
| 3,014,941 | 12/1961 | Walsh | 260—448 |
| 3,042,696 | 7/1962 | Aldridge | 260—632 |
| 3,048,612 | 8/1962 | Walde | 260—632 |
| 3,097,226 | 7/1963 | Napier | 260—632 |

LEON ZITVER, *Primary Examiner.*

M. B. ROBERTO, J. E. EVANS, *Assistant Examiners.*